United States Patent
Nagao et al.

(10) Patent No.: US 9,682,365 B2
(45) Date of Patent: Jun. 20, 2017

(54) EXHAUST GAS PURIFICATION CATALYST COMPOSITION AND EXHAUST GAS PURIFICATION CATALYST

(71) Applicant: Mitsui Mining & Smelting Co., Ltd., Tokyo (JP)

(72) Inventors: Yuki Nagao, Saitama (JP); Hironori Iwakura, Saitama (JP); Yunosuke Nakahara, Saitama (JP); Masato Machida, Kumamoto (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/891,553

(22) PCT Filed: Apr. 17, 2014

(86) PCT No.: PCT/JP2014/060914
§ 371 (c)(1),
(2) Date: Nov. 16, 2015

(87) PCT Pub. No.: WO2014/185211
PCT Pub. Date: Nov. 20, 2014

(65) Prior Publication Data
US 2016/0121310 A1    May 5, 2016

(30) Foreign Application Priority Data

May 17, 2013  (JP) ................. 2013-105135

(51) Int. Cl.
*B01J 27/185* (2006.01)
*F01N 3/28* (2006.01)
*B01D 53/94* (2006.01)
*B01J 37/02* (2006.01)
*B01J 23/00* (2006.01)
*B01J 35/04* (2006.01)
*B01J 37/00* (2006.01)
*B01J 23/46* (2006.01)
*B01J 35/02* (2006.01)

(52) U.S. Cl.
CPC ........ *B01J 27/1856* (2013.01); *B01D 53/945* (2013.01); *B01J 23/002* (2013.01); *B01J 23/464* (2013.01); *B01J 35/026* (2013.01); *B01J 35/04* (2013.01); *B01J 37/0036* (2013.01); *B01J 37/0234* (2013.01); *F01N 3/2828* (2013.01); *B01D 2251/204* (2013.01); *B01D 2251/208* (2013.01); *B01D 2255/1021* (2013.01); *B01D 2255/1025* (2013.01); *B01D 2255/2092* (2013.01); *B01D 2255/20715* (2013.01); *B01D 2255/908* (2013.01); *B01D 2257/404* (2013.01); *B01D 2258/012* (2013.01); *B01J 2523/00* (2013.01); *F01N 2370/04* (2013.01); *F01N 2510/063* (2013.01); *Y02T 10/22* (2013.01)

(58) Field of Classification Search
None
See application file for complete search history.

(56) References Cited

U.S. PATENT DOCUMENTS

| | | | | | |
|---|---|---|---|---|---|
| 5,945,369 | A | * | 8/1999 | Kimura ................ | B01D 53/945 502/304 |
| 6,375,910 | B1 | * | 4/2002 | Deeba ................ | B01D 53/9422 422/171 |
| 2002/0039966 | A1 | * | 4/2002 | Tanaka .................... | B01J 23/40 502/332 |
| 2002/0086795 | A1 | * | 7/2002 | LaBarge ............ | B01D 53/9422 502/208 |
| 2003/0086835 | A1 | * | 5/2003 | Suzawa .............. | B01D 53/9418 422/180 |
| 2012/0058019 | A1 | * | 3/2012 | Mizutani .............. | B01D 53/944 422/178 |
| 2014/0221198 | A1 | * | 8/2014 | Nagao .................. | B01J 27/1804 502/213 |

FOREIGN PATENT DOCUMENTS

| | | | |
|---|---|---|---|
| CN | 102979607 | | 3/2013 |
| JP | 06-055075 | * | 3/1994 |
| JP | 08-281116 | | 10/1996 |
| WO | 2013035568 | | 3/2013 |

OTHER PUBLICATIONS

JP06-055075 (Mar. 1994) Translation.*
International Search Report dated Jul. 15, 2014 filed in PCT/JP2014/060914.
Chinese Office Action dated Aug. 2, 2016 issued in the corresponding Chinese patent application No. 201480020344.7.

* cited by examiner

*Primary Examiner* — Melvin C Mayes
*Assistant Examiner* — Colette Nguyen
(74) *Attorney, Agent, or Firm* — Rankin, Hill & Clark LLP

(57) ABSTRACT

Provided is a new catalyst that can have heightened purification performance for NOx under lean conditions. Proposed is an exhaust gas purification catalyst composition provided with: a carrier (A) comprising zirconium phosphate; a catalyst active component (a) supported on the carrier (A); a carrier (B) comprising an inorganic oxide porous body; and a catalyst active component (b) supported on the carrier (B).

7 Claims, No Drawings

EXHAUST GAS PURIFICATION CATALYST COMPOSITION AND EXHAUST GAS PURIFICATION CATALYST

TECHNICAL FIELD

The present invention relates to an exhaust gas purification catalyst composition which is used for purifying an exhaust gas to be emitted from an internal-combustion engine such as a gasoline engine of two-wheel or four-wheel automobiles or the like and an exhaust gas purification catalyst in which the composition is supported on a substrate. More specifically, the invention relates to an exhaust gas purification catalyst having excellent purification performance for $NO_x$ under lean conditions.

BACKGROUND ART

An exhaust gas of automobiles which use gasoline for fuel contains hazardous components such as hydrocarbon (THC), carbon monoxide (CO), and nitrogen oxide ($NO_x$) Therefore, it is necessary to purify each of the hazardous components in such a manner that the hydrocarbon (THC) is converted into water and carbon dioxide by oxidation; the carbon monoxide (CO) is converted into the carbon dioxide by oxidation; and the nitrogen oxide ($NO_x$) is converted into nitrogen by reduction.

As a catalyst (hereinafter, referred to as an "exhaust gas purification catalyst") adapted to treat these exhaust gases, three way catalysts (TWC) capable of being used for a redox of CO, THC, and NO have been used.

Three way catalysts are well known, in which a precious metal such as Pt, Pd, and Rh is supported on a refractory oxide porous material having a high-specific surface area, for example, an alumina porous material having a high-specific surface area and the precious metal is supported on a substrate, for example, a monolithic substrate made of a refractory ceramic or metallic honeycomb structure or on refractory particles.

Since purification characteristics (three way characteristics) for CO, KC, and $NO_x$ due to the three way catalysts are closely related to a stoichiometric air-fuel ratio (A/F) representing the atmosphere of an automobile exhaust gas, the three way catalysts were generally controlled to the following conditions in the past: A/F was around 14.6 (stoichiometric air-fuel ratio) in which exhaust gas purification function was sufficiently exhibited, in other words, an excess air ratio λ was near 1.

In recent years, from the viewpoint of improving fuel efficiency and reducing the carbon dioxide emission amount, an engine is desirably controlled in a slightly lean area in which the air-fuel ratio is higher than the stoichiometric air-fuel ratio (A/F=14.6), that is, satisfies a level of 14.6<A/F≤16.0. In the case of a slightly lean control to make a lean combustion in an oxygen-rich atmosphere, since the amount of fuel to be used is reduced, the fuel efficiency can be improved and the generation of $CO_2$ as a combustion exhaust gas can also be suppressed.

However, since the oxygen becomes excessive and the purification performance of exhaust gas purification catalyst for $NO_x$ is extremely deteriorated under the lean condition as described above, catalysts have been desirably developed which can purify $NO_x$ with high efficiency even under the lean condition.

As the catalyst capable of purifying $NO_x$ with high efficiency even under the lean condition, the applicant has proposed a catalyst in which Rh is supported on a carrier consisting of zirconium phosphate (Patent Document 1).

CITATION LIST

Patent Document

Patent Document 1: WO 2013035568 A1

SUMMARY OF THE INVENTION

Problem to be Solved by the Invention

Compared with the catalyst disclosed in Patent Document 1, that is, the catalyst in which Rh is supported on the carrier consisting of the zirconium phosphate, the invention is to provide a novel catalyst that can further improve the purification performance for NO under the lean condition.

Means for Solving Problem

The invention is to propose an exhaust gas purification catalyst composition including: a carrier A consisting of a zirconium phosphate; a catalytically active component (a) supported on the carrier A; a carrier B consisting of an inorganic oxide porous material; and a catalytically active component (b) supported on the carrier B.

In addition, as an exhaust gas purification catalyst, the invention is to propose an exhaust gas purification catalyst having a structure in which the exhaust gas purification catalyst composition is supported on a substrate and an exhaust gas purification catalyst having a structure in which the exhaust gas purification catalyst composition is formed into a pellet shape.

Effect of the Invention

According to the exhaust gas purification catalyst composition of the invention and the catalyst using the same, it is possible to further improve the purification performance for $NO_x$ under the lean condition even compared with the catalyst disclosed in Patent Document 1, that is, the catalyst in which Rh is supported on the carrier consisting of the zirconium phosphate More specifically, it is possible to accelerate a reduction reaction of $NO_x$ using each of CO and $C_3H_6$ as a reducing agent (CO—NO reaction, $C_3H_6$—NO reaction) and to exhibit the particularly excellent purification performance for $NO_x$ in an area 14.6<A/F≤16.0 even under the lean condition.

MODE(S) FOR CARRYING OUT THE INVENTION

Next, embodiments of the invention will be described. However, the invention is not intended to be limited to the embodiments described below.

<Present Catalyst Composition>

An exhaust gas purification catalyst composition (referred to as a "present catalyst composition") according to an embodiment is an exhaust gas purification catalyst composition including: a carrier A consisting of a zirconium phosphate; a catalytically active component (a) supported on the carrier A; a carrier B consisting of an inorganic oxide porous material; and a catalytically active component (b) supported on the carrier B.

(Carrier A)

The carrier A is a carrier consisting of a zirconium phosphate.

The zirconium phosphate may be either of a crystalline substance or an amorphous substance. Among them, the crystalline zirconium phosphate is preferred, and a zirconium phosphate represented by $ZrP_2O_7$ is particularly preferred.

A method of producing the zirconium phosphate is not particularly limited. Examples of the method may include a coprecipitation method and a hydrothermal method.

The carrier A consisting of the zirconium phosphate is not a porous material and is different from an inorganic porous material such as alumina or zirconia in terms of being present in a dense state.

A specific surface area of the carrier A consisting of the zirconium phosphate has usually a value of 1 to 100 $m^2/g$ which is measured by a BET method. In order to sufficiently obtain reaction activity, it is preferable to ensure a specific surface area of a certain value or more. However, when an initial specific surface area is too high, pores are filled when a thermal load is applied and a precious metal present on a surface can be easily buried. From this viewpoint, the specific surface area of the carrier A consisting of the zirconium phosphate is preferably 1 $m^2/g$ or more or 30 $m^2/g$ or less and more preferably 3 $m^2/g$ or more or 15 $m^2/g$ or less as a value measured by the BET method.

An average diameter of the carrier A consisting of the zirconium phosphate is usually 1 to 40 μm and preferably 5 μm or more or 20 μm or less. With respect to the average diameter of the carrier A, the carrier A is directly observed by SEM to measure its diameter, and thus the average diameter can be calculated.

Catalytically Active Component (a)

An example of the catalytically active component (a) supported on the carrier A may include a metal such as palladium (Pd), platinum, rhodium (Rh), gold, silver, ruthenium, iridium, nickel, cerium, cobalt, copper, osmium, strontium, iron, manganese, or tungsten. From the viewpoint of increasing purification performance for $NO_x$ under lean conditions, the catalytically active component (a) more preferably includes the rhodium (Rh).

In terms of enhancing catalyst activity and preventing aggregation of components when subjected to a thermal load, the catalytically active component (a) may be contained in the carrier A by a ratio of 0.1 to 1.0 wt % and is preferably contained in the carrier A by a ratio of 0.1 to 0.5 wt %.

(Carrier B)

The carrier B consists of an inorganic oxide porous material.

In order to increase activity of a precious metal, the porous material preferably has proper acidity. Therefore, an example of the inorganic oxide porous material contained in the carrier B may preferably include an oxide porous material having a Hammett acidity function $H_{0max}$ of $-10<H_{0max}<15$. Sintering of an active component can be suppressed when the $H_{0max}$ is greater than $-10$, whereas the reduction in activity due to stabilization of an active component oxide can be suppressed when the $H_{0max}$ is less than 15. From these viewpoints, an example of the inorganic oxide porous material contained in the carrier B may preferably include the oxide porous material having the Hammett acidity function $H_{0max}$ of $-10<H_{0max}<15$ and may further preferably include an oxide porous material having a Hammett acidity function $H_{0max}$ of 0 or more or 10 or less.

Examples of the oxide porous materials may include silica, silica-alumina, ceria, ceria-zirconia, lanthanum, alumina, alumino-silicate, alumina-zirconia, alumina-chromia, alumina-ceria titania. Each of these oxide porous materials can be used singly or two kinds or more thereof can be used in combination with each other. From the viewpoint of increasing purification performance for $NO_x$ under lean conditions, the oxide porous material particularly preferably includes the titania.

A specific surface area of the carrier B has usually a value of 10 to 200 $m^2/g$ and preferably 30 $m^2/g$ or more or 150 $m^2/g$ or less which is measured by the BET method.

An average diameter of the carrier B is usually 1 μm to 40 μm and preferably 5 μm or more or 20 μm or less.

With respect to the average diameter of the carrier B, the carrier B is directly observed by SEM to measure its diameter, and thus the average diameter can be calculated.

The sizes of the carrier A and the carrier B are not particularly limited as long as the sizes of the carrier A and the carrier B are different from each other to such an extent that the carrier A supports the carrier B and vice versa. Accordingly, the ratio of the average diameter of the carrier A to that of the carrier B may be 1:40 to 40:1 and particularly preferably 5:20 to 20:5.

The carrier A and the carrier B may contain impurities within a range of not damaging effects of the invention.

(Catalytically Active Component (b))

An example of the catalytically active component (b) supported on the carrier B may include a metal such as palladium (Pd), platinum (Pt), rhodium, gold, silver, ruthenium, iridium, nickel, cerium, cobalt, copper, osmium, strontium, iron, manganese, or tungsten. From the viewpoint of increasing purification performance for NO under lean conditions, the catalytically active component (b) particularly preferably includes the platinum (Pt).

Some of the catalytically active components (a) may be supported on the carrier B or some of the catalytically active components (h) may be supported on the carrier A. At this time, a large number (50% or more) of the catalytically active components a may be supported on the carrier 2, and a large number (50% or more) of the catalytically active components (b) may be supported on the carrier B.

In terms of enhancing catalyst activity and preventing aggregation of components when subjected to a thermal load, the catalytically active component (b) may be contained in the carrier B by a ratio of 0.1 to 1.0 wt % and is preferably contained in the carrier B by a ratio of 0.1 to 0.5 wt %.

(Other Components Capable of being Contained in Present Catalyst Composition)

The present catalyst composition may contain other components. For example, the present catalyst composition may contain a binder, a stabilizer, as OSC material or other components.

Examples of the binder component may include an inorganic binder, for example an aqueous solution such as alumina sol, silica sol, or zirconia sol. These can take a form of an inorganic oxide when being calcined.

Examples of the stabilizer may include an alkaline-earth metal or an alkaline metal. Particularly, the stabilizer can be selected from one kind or two or more kinds of metals selected from the group consisting of magnesium, barium, calcium, and strontium, and preferably, the stabilizer can be selected from one kind or two or more kinds of metals selected from the group consisting of strontium and barium.

The OSC material may be a material having an oxygen storage capacity (OSC). For example, the OSC material may include cerium compound particles, zirconium compound particles, and ceria-zirconia particles.

(Production Method of Present Catalyst Composition)

The carrier A consisting of the zirconium phosphate, the catalytically active component (a), water, and other raw materials as needed are mixed and stirred with each other to obtain a slurry, whereas the carrier B consisting of the inorganic oxide porous material, the catalytically active component (b), water, and other raw materials as needed are mixed and stirred with each other to obtain a slurry. Thereafter, both slurries are mixed with each and dried as needed, whereby it is possible to obtain the present catalyst composition.

<Present Catalyst>

Next, a catalyst for exhaust gas purification (hereinafter, referred to as a "present catalyst") will be described, which can be prepared using the present catalyst composition.

The present catalyst can be prepared in such a manner that the present catalyst composition is supported on a substrate.

In addition, the present catalyst can be prepared in such a manner that the present catalyst composition is formed into a pellet shape.

As specific configuration example of the present catalyst, for example, the present catalyst may include a catalyst provided with a catalyst layer which is formed through processes of preparing a slurry by mixing the present catalyst composition with water and other components, stirring the mixed present catalyst composition using a ball mill, and applying the slurry on a substrate by a wash coat.

In addition, another example of the present catalyst may include a catalyst provided with a catalyst layer which is formed on the surface of the substrate through processes of preparing a slurry by mixing the present catalyst composition with water and other components and stirring the mixed present catalyst composition using the ball mill, immersing the substrate into the slurry, and then pulling up the immersed substrate to calcine it.

However, the method of producing the present catalyst can employ ail of the known methods as a part of the processes, and is not limited to the above examples.

(Substrate)

Examples of the substrate material used in the present catalyst may include refractory materials such as ceramics or metal materials.

Examples of the ceramic substrate material may include a refractory ceramic material, for example, cordierite, cordierite-alpha alumina, silicon nitride, zircon mullite, spodumene, alumina-silica magnesia, zircon silicate, sillimanite, magnesium silicate, zircon, petalite, alpha alumina, and alumino-silicates.

Examples of the metal substrate material may include a refractory metal, for example, other suitable corrosion-resistant alloys based on stainless steel or iron.

The shape of the substrate may include a honeycomb shape, a pellet shape, or a spherical shape.

The honeycomb material may generally use, for example, a cordierite material such as the ceramics in many cases. In addition, the honeycomb material may use the honeycomb formed of a metal material such as ferritic stainless steel.

In the case of using the substrate of the honeycomb shape, for example, it is possible to use a monolithic substrate which has a plurality of minute gas flow passages, that is, channels parallel to each other inside the substrate so that fluid flows through the inside of the substrate. At this time, catalyst compositions may be coated on the inner wall surface of each channel of the monolithic substrate by the wash coat to form the catalyst layer.

(Catalyst Layer)

The catalyst layer may be stacked with one or two or more in a vertical direction, and another catalyst layer may be formed in a flowing direction of an exhaust gas.

<Explanation of Expressions>

In this specification, when the expression "X to Y" (X and Y are arbitrary numbers) is used, unless otherwise explicitly mentioned, the meaning "X or greater but Y or less" is included and at the same time, the meaning of "preferably greater than X" or "preferably less than Y" is included.

In addition, the expression "X or greater" (X is an arbitrary number) or "Y or less" is an arbitrary number) includes the intention preferable to be greater than X" or "it is preferable to be less than Y".

EXAMPLES

Hereinafter, the invention will be further described in detail based on the following Examples and Comparative Examples.

<Synthesis of Zirconium Phosphate ($ZrP_2O_7$)>

After zirconium oxynitrate dehydrate of 203.6 g was dissolved in deionized water, aqueous ammonia of 4 mol/L was slowly added dropwise to a solution charged with 85%-phosphate of 173.9 g to obtain a value of pH 8, and the obtained gel-like product was washed and filtered with deionized water and was then subjected to drying at 120° C. through the night. After the drying, the product was calcined at 900° C. for five hours in the air to obtain zirconium phosphate ($ZrP_2O_7$).

Example 1

The zirconium phosphate ($ZrP_2O_7$) and La-stabilized alumina ($H_{0max}$: 7.1) obtained as described above were individually made into a slurry by a wet grinding treatment. The specific surface area (BET) of the zirconium phosphate ($ZrP_2O_7$) after the grinding was $m^2/g$ (the specific surface area (BET) of zirconium phosphate ($ZrP_2O_7$) used in the following Examples is also the same). The zirconium phosphate slurry was added with an Rh salt solution and was then stirred for two hours. Meanwhile, the La-stabilized alumina was dispersed into the deionized water to obtain a slurry, and the resulting slurry was added with a Pt salt solution and was then stirred for two hours. Thereafter, the stirred mixture was added to the Rh-containing zirconium phosphate slurry and was then stirred for one hour, and then a hinder component was added thereto.

With respect to various components contained in the slurry, when the zirconium phosphate was set to be 73 parts by mass, the slurry contained the La-stabilized alumina of 21 parts by mass, and the binder of 6 parts by mass, Rh of 0.14 wt % with respect to the total mass of the zirconium phosphate, and Pt of 0.24 wt % with respect to the total mass of the La-stabilized alumina.

The resulting slurry was dried and calcined in a state of being coated on a ceramic honeycomb substrate by 100 g/L to obtain a catalyst layer formed on the ceramic honeycomb substrate and the resultant was used as a honeycomb catalyst for activity evaluation.

In the catalyst layer, Rh of 0.10 g/L was supported on a carrier consisting of the zirconium phosphate and Pt of 0.05 g/L was supported on the La-stabilized alumina.

Example 2

The zirconium phosphate ($ZrP_2O_7$) obtained as described above and a ceria-zirconia composite oxide ($CeO_2$—$ZrO_2$)

were individually made into a slurry by a wet grinding treatment. The zirconium phosphate slurry was added with an Rh salt solution and was then stirred for two hours. Meanwhile, the ceria-zirconia composite oxide ($CeO_2$—$ZrO_2$) was dispersed into deionized water to obtain a slurry, and the resulting slurry was added with a Pt salt solution and was then stirred for two hours. Thereafter, the stirred mixture was added to the Rh-containing zirconium phosphate slurry and was then stirred for one hour, and then a binder component was added thereto.

With respect to various components contained in the slurry, when the zirconium phosphate was set to be 73 parts by mass, the slurry contained the ceria-zirconia composite oxide ($CeO_2$) of 21 parts by mass, and the binder of 6 parts by mass, Rh of 0.14 wt %, respect to the total mass of the zirconium phosphate, and Pt of 0.24 wt % with respect to the total mass of the ceria-zirconia composite oxide ($CeO_2$—$ZrO_2$).

The resulting slurry was dried and calcined in a state of being coated on a ceramic honeycomb substrate by 100 g/L to obtain a catalyst layer formed on the ceramic honeycomb substrate and the resultant was used as a honeycomb catalyst for activity evaluation.

In the catalyst layer, Rh of 0.10 g/L was supported on a carrier consisting of the zirconium phosphate and Pt of 0.05 g/L was supported on the ceria-zirconia composite oxide ($CeO_2$—$ZrO_2$).

Example 3

The zirconium phosphate ($ZrP_2O_7$) obtained as described above was made into a slurry by a wet grinding treatment. The zirconium phosphate slurry was added with an Rh salt solution and was then stirred for two hours. Meanwhile, $CeO_2$ was dispersed into deionized water to obtain a slurry, and the resulting slurry was added with a Pt salt solution and was then stirred for two hours. Thereafter, the stirred mixture was added to the Rh-containing zirconium phosphate slurry and was then stirred for one hour, and then a binder component was added thereto.

With respect to various components contained in the slurry, when the zirconium phosphate was set to be 7 parts by mass, the slurry contained $CeO_2$ of 21 parts by mass, the binder of 6 parts by mass, Rh of 0.14 wt % with respect to the total mass of the zirconium phosphate, and Pt of 0.24 wt % with respect to the total mass of $CeO_2$.

The resulting slurry was dried and calcined in a state of being coated on a ceramic honeycomb substrate by 100 g/L and the resultant was used as a honeycomb catalyst for activity evaluation.

In the catalyst layer, Rh of 0.10 q/L was supported on a carrier consisting of the zirconium phosphate and Pt of 0.05 g/L was supported on $CeO_2$.

Example 4

The zirconium phosphate ($ZrP_2O_7$) obtained as described above was made into a slurry by a wet grinding treatment. The zirconium phosphate slurry was added with an Rh salt solution and was then stirred for two hours. Meanwhile, $ZrO_2$ ($H_{0max}$: 9.3) was dispersed into deionized water to obtain a slurry, and the resulting slurry was added with a Pt salt solution and was then stirred for two hours. Thereafter, the stirred mixture was added to the Rh-containing zirconium phosphate slurry and was then stirred for one hour, and then a binder component was added thereto.

With respect to various components contained in the slurry, when the zirconium phosphate was set to be 73 parts by mass, the slurry contained $ZrO_2$ of 21 parts by mass, and the binder of 6 parts by mass, Rh of 0.14 wt % with respect to the total mass of the zirconium phosphate, and Pt of 0.24 wt % with respect to the total mass of $ZrO_2$.

The resulting slurry was dried and calcined in a state of being coated on a ceramic honeycomb substrate by 100 g/L and the resultant was used as a honeycomb catalyst for activity evaluation.

In the catalyst layer, h of 0.10 g/L was supported on a carrier consisting of the zirconium phosphate and Pt of 0.05 g/L was supported on $ZrO_2$.

Example 5

The zirconium phosphate ($ZrP_2O_7$) obtained as described above was made into slurry by a wet grinding treatment. The zirconium phosphate slurry was added with an Rh salt solution and was then stirred for two hours. Meanwhile, $TiO_2$ ($H_{0max}$: 4.3) was dispersed into deionized water to obtain a slurry, and the resulting slurry was added with a Pt salt solution and was then stirred for two hours. Thereafter, the stirred mixture was added to the Rh-containing zirconium phosphate slurry and was then stirred for one hour, and then a binder component was added thereto.

With respect to various components contained in the slurry, when the zirconium phosphate was set to be 73 parts by mass, the slurry contained $TiO_2$ of 21 parts by mass, and the binder of 6 parts by mass, Rh of 0.14 wt % with respect to the total mass of the zirconium phosphate, and Pt of 0.24 wt % with respect to the total mass of $TiO_2$.

The resulting slurry was dried and calcined in a state of being coated on a ceramic honeycomb substrate by 100 g/L and the resultant was used as a honeycomb catalyst for activity evaluation.

In the catalyst layer, Rh of 0.10 q/L was supported on a carrier consisting of the zirconium phosphate and Pt of 0.05 g/L was supported on $TiO_2$.

Example 6

The zirconium phosphate ($ZrP_2O_7$) obtained as described above was made into a slurry by a wet grinding treatment. The zirconium phosphate slurry was added with an Rh salt solution and was the a stirred for two hours. Meanwhile, $SiO_2$ ($H_{0max}$: 3.3) was dispersed into deionized water to obtain a slurry, and the resulting slurry was added with a Pt salt solution and was then stirred for two hours. Thereafter, the stirred mixture was added to the Rh-containing zirconium phosphate slurry and was then stirred for one hour, and then a binder component was added thereto.

With respect to various components contained in the slurry, when the zirconium phosphate was set to be 73 parts by mass, the slurry contained $SiO_2$ of 21 parts by mass, and the binder of 6 parts by mass, Rh of 0.14 wt % with respect to the total mass of the zirconium phosphate, and Pt of 0.24 wt % with respect to the total mass of $SiO_2$.

The resulting slurry was dried and calcined in a state of being coated on a ceramic honeycomb substrate by 100 g/L and the resultant was used as a honeycomb catalyst for activity evaluation.

In the catalyst layer, h of 0.10 g/L was supported on a carrier consisting of the zirconium phosphate and Pt of 0.05 g/L was supported on $SiO_2$.

Comparative Example 1

The zirconium phosphate ($ZrP_2O_7$) and La-stabilized alumina obtained as described above were individually made into a slurry by a wet grinding, treatment. After the zirconium phosphate slurry was added with an Rh salt solution and was then stirred for two hours, the stirred mixture was added with the La-stabilized alumina slurry and was then stirred for one hour, and then a binder component was added thereto.

Rh was set to contain 0.21 wt % with respect to the total mass of the zirconium phosphate.

The resulting slurry was dried and calcined in a state of being coated on a ceramic honeycomb substrate by 100 g/L and the resultant was used as a honeycomb catalyst for activity evaluation.

In the catalyst layer, Rh of 0.15 g/L was supported on a carrier consisting of the zirconium phosphate.

<Evaluation Method of Catalyst Performance>

A/F scanning evaluation of the honeycomb catalyst was performed in the following manner: complete-combustion-simulated exhaust gas consisting of CO, $CO_2$, $C_3H_6$, $O_2$, NO, and $H_2O$, the balance being $N_2$ was subjected to scanning until A/F was 15.0 to 15.3 (until CO and $O_2$ concentration was changed) and flowed through the ceramic honeycomb catalyst at an SV of 100,000 $h^{-1}$; and an outlet gas component was measured at 400° C. using a CO/HC/NO analyzer (MOTOR EXHAUST GAS ANALYZER MEXA9100 made by HORIBA Ltd.) to compare the performance of each Rh-supporting catalyst.

By the A/F scanning evaluation of the honeycomb catalyst, the performance comparison was performed on the catalyst after the simulated exhaust gas was used for a long period. With respect to endurance condition of the simulated exhaust gas, a catalyst was placed in an electric furnace maintained at 800° C., and to the furnace accommodating the catalyst, a gas mixture (for 20 s) of $C_3H_6$ and CO or $C_3H_6$ and $O_2$ (complete combustion ratio), and air (for 10 s) were alternately and periodically fed for 50 hours.

A purification rate (%) of $NO_x$ in an A/F sweep test of $C_3H_6$—CO—NO reaction for each catalyst was indicated in Table 1, a purification rate (%) of $NO_x$ in an sweep test of $C_3H_6$—NO reaction for each catalyst was indicated in Table 2, and a purification rate (%) of $NO_x$ in an A/F sweep test of CO—NO reaction for each catalyst was indicated in Table 3.

In Tables 1 to 3, "$Al_2O_3$" indicates La-stabilized alumina, "$MO_x$" indicates an inorganic oxide, and "ZPO" indicates zirconium phosphate ($ZrP_2O_7$).

TABLE 1

| | | A/F | | | |
|---|---|---|---|---|---|
| Cat. | | 15.0 | 15.1 | 15.2 | 15.3 |
| Comparative Example 1 | Rh/ZPO + $Al_2O_3$ | 47.6 | 34.3 | 25.6 | 17.3 |
| | Rh/ZPO + Pt/$MO_x$ | | | | |
| Example 1 | $MO_x$=$Al_2O_3$ (7.1) | 54.7 | 48.5 | 41.5 | 35.3 |
| Example 2 | $MO_x$=$CeO_2$—$ZrO_2$ | 50.0 | 40.2 | 34.2 | 27.9 |
| Example 3 | $MO_x$=$CeO_2$ | 32.7 | 24.9 | 20.3 | 14.5 |
| Example 4 | $MO_x$=$ZrO_2$ (9.3) | 21.0 | 19.9 | 18.9 | 16.9 |
| Example 5 | $MO_x$=$TiO_2$ (4.3) | 62.1 | 53.2 | 46.3 | 37.8 |
| Example 6 | $MO_x$=$SiO_2$ (3.3) | 53.0 | 47.6 | 42.7 | 36.3 |

* Numeric values in parenthesis indicate Hammett acidity functions.

TABLE 2

| | | A/F | | | |
|---|---|---|---|---|---|
| Cat. | | 15.0 | 15.1 | 15.2 | 15.3 |
| Comparative Example 1 | Rh/ZPO + $Al_2O_3$ | 16.3 | 9.9 | 5.4 | 3.2 |
| | Rh/ZPO + Pt/$MO_x$ | | | | |
| Example 1 | $MO_x$=$Al_2O_3$ | 29.6 | 27.4 | 24.7 | 23.7 |
| Example 5 | $MO_x$=$TiO_2$ | 34.0 | 29.0 | 24.6 | 21.4 |
| Example 6 | $MO_x$=$SiO_2$ | 45.9 | 33.7 | 27.0 | 22.4 |

TABLE 3

| | | A/F | | | |
|---|---|---|---|---|---|
| Cat. | | 15.0 | 15.1 | 15.2 | 15.3 |
| Comparative Example 1 | Rh/ZPO + $Al_2O_3$ | 43.3 | 33.4 | 28.1 | 22.2 |
| | Rh/ZPO + Pt/$MO_x$ | | | | |
| Example 1 | $MO_x$=$Al_2O_3$ | 55.3 | 43.8 | 36.9 | 29.3 |
| Example 5 | $MO_x$=$TiO_2$ | 66.2 | 54.7 | 47.7 | 39.6 |
| Example 6 | $MO_x$=$SiO_2$ | 53.5 | 45.5 | 40.3 | 34.0 |

(Results of Evaluation)

As seen from Table 1, purification performance for $NO_x$ was significantly improved under lean conditions in Example 1 compared with Comparative Example 1, and excellent purification performance for $NO_x$ was shown in an area of 15.0≤A/F≤15.3 when an Rh/zirconium phosphate was added with an Pt-supported inorganic oxide.

In Examples 1 to 6 in Table 1, the purification performance for NO was reduced when a basic metal oxide having a value of Hammett acidity function higher than that of $Al_2O_3$ was added. However, purification capability for $NO_x$ equal to or higher than that of Example 1 was shown when a metal oxide having a value of Hammett acidity function equal to or lower than that of $Al_2O_3$ was added. In particular, higher purification performance for $NO_x$ was observed in a lean area of 15.0≤A/F≤15.3 in Example 5 compared with Comparative Example 1.

In $C_3H_6$—NO reaction in Table 2, the improvement in purification capability for $NO_x$ was observed in Examples 1, 5, and 6 compared with Comparative Example 1, and particularly, the same level of purification capability for $NO_x$ was shown in an area of A/F≥15.2 regardless of kinds of metal oxides. This is considered because the effect of Pt is remarkable for the $C_3H_6$—NO reaction in a lean area of A/F≥15.2.

In CO—NO reaction in Table 3, the improvement in purification capability for $NO_x$ was observed in Examples 1, 5, and 6 compared with Comparative Example 1 The purification capability for $NO_x$ was greatly varied depending on kinds of metal oxides, and particularly, the purification capability for NO was significantly improved is Example 5.

From the above, it is considered that performance is specifically improved due to acceleration of the $C_3H_6$—NO reaction by addition of Pt and improvement of CO—NO reactivity by addition of $TiO_2$ in Example 5 in Table 1.

The invention claimed is:

1. An exhaust gas purification catalyst composition comprising:
   a carrier A comprising a zirconium phosphate;
   a catalytically active component (a) supported on the carrier A;
   a carrier B comprising an inorganic oxide porous material; and a catalytically active component (b) supported on the carrier B, wherein the carrier B is one or more inorganic oxide porous materials selected from a group consisting of silica, silica-alumina, ceria-zirconia, lanthanum, alumina, alumino-silicate, alumina-zirconia, alumina-chromia, alumina-ceria titania, and titania, the catalytically active component (a) comprises Rh, 50% or more of the catalytically active component (a) is supported on the carrier A, and 50% or more of the catalytically active component (b) is supported on the carrier B.

2. The exhaust gas purification catalyst composition according to claim 1, wherein the carrier B contains an oxide porous material having a Hammett acidity function $H_{0max}$ of $-10<H_{0max}<15$.

3. The exhaust gas purification catalyst composition according to claim 1, wherein the catalytically active component (b) supported on the carrier B is Pt.

4. The exhaust gas purification catalyst composition according to claim 1, wherein the catalytically active component (a) supported on the carrier A consists of Rh.

5. An exhaust gas purification catalyst having a structure in which the exhaust gas purification catalyst composition according to claim 1 is supported on a substrate.

6. An exhaust gas purification catalyst having a structure in which the exhaust gas purification catalyst composition according to claim 1 is formed into a pellet shape.

7. The exhaust gas purification catalyst composition according to claim 1, wherein the carrier B is one or more inorganic oxide porous materials selected from a group consisting of ceria-zirconia, lanthanum, alumina-zirconia, alumina-chromia, and alumina-ceria titania.

* * * * *